(12) United States Patent
Mullen et al.

(10) Patent No.: US 9,916,572 B2
(45) Date of Patent: Mar. 13, 2018

(54) PAYMENT CARD PROCESSING SYSTEM

(75) Inventors: Shawn Patrick Mullen, Buda, TX (US); Arthur James Tysor, Buda, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2026 days.

(21) Appl. No.: 12/858,778

(22) Filed: Aug. 18, 2010

(65) Prior Publication Data
US 2012/0047071 A1 Feb. 23, 2012

(51) Int. Cl.
*G06Q 40/00* (2012.01)
*G06Q 20/32* (2012.01)
*G06Q 20/34* (2012.01)
*G06Q 20/38* (2012.01)
*G06Q 20/40* (2012.01)
*G07F 7/02* (2006.01)

(52) U.S. Cl.
CPC ....... *G06Q 20/3278* (2013.01); *G06Q 20/342* (2013.01); *G06Q 20/3415* (2013.01); *G06Q 20/352* (2013.01); *G06Q 20/385* (2013.01); *G06Q 20/40* (2013.01); *G07F 7/025* (2013.01)

(58) Field of Classification Search
None
See application file for complete search history.

(56) References Cited

U.S. PATENT DOCUMENTS

| | | | |
|---|---|---|---|
| 6,609,654 B1* | 8/2003 | Anderson et al. | 235/379 |
| 7,194,438 B2* | 3/2007 | Sovio et al. | 705/50 |
| 7,357,310 B2 | 4/2008 | Calabrese | |
| 7,600,676 B1 | 10/2009 | Rados | |
| 7,705,732 B2 | 4/2010 | Bishop | |
| 8,052,052 B1* | 11/2011 | Power | 235/380 |
| 2006/0080232 A1* | 4/2006 | Epps | 705/39 |
| 2008/0169351 A1 | 7/2008 | Whiting | |
| 2009/0037274 A1 | 2/2009 | Yaccarino | |
| 2009/0200371 A1* | 8/2009 | Kean et al. | 235/379 |
| 2009/0319771 A1* | 12/2009 | Nagaraja | 713/151 |

* cited by examiner

*Primary Examiner* — Scott S Trotter
(74) *Attorney, Agent, or Firm* — David A. Mims, Jr.; Joseph H Petrokaitis; Robert V. Wilder

(57) ABSTRACT

A method, programmed medium and system are provided for using a payment card with an embedded RFID device. In one example, a cellular telephone or other wireless device is used to generate a one-time password (OTP), which is then transmitted by a read-write RFID in the wireless device to the read-write RFID which is embedded within a payment card. The user's phone or other wireless device then activates the writing of the OTP to the RFID of the payment card. The payment card, with the one time password now saved in the card, is then handed to the waiter or store clerk for payment approval and/or further processing. The user's OTP is then read by the merchant's RFID reader and transmitted to an approving agency/server for approval or disapproval of the user's purchase.

12 Claims, 6 Drawing Sheets

PAYMENT CARD PROCESSING SYSTEM

FIELD OF THE INVENTION

The present invention relates generally to information processing systems and more particularly to a methodology and implementation for enabling more secure purchasing transactions using payment cards.

BACKGROUND OF THE INVENTION

Today, most consumer and other payment transactions involve the use of a debit card or a credit card. As used herein. The term "payment card", "card" or "charge card", includes, inter alia, credit cards as well as debit cards. Unfortunately, one of the problems encountered in using such cards is the inherent security risk one takes when using a payment card to pay a merchant for goods or services received. Oftentimes, the owner's payment card disappears from the owner's view, such as, for example, in a restaurant, when a waiter takes the card to a card reading station and out of sight of the card owner. In such situations, it is not possible to keep a watchful eye on the card while the waiter takes the card to a processing location in the merchant's place of business and processes the card for approval of the user's purchase. During this time, it is possible for an employee or even a casual observer to read or copy the card information, such as the card number, card issuing agency, personal identification number (PIN), etc., and subsequently to make unauthorized purchases using the copied information from the user's card. This is an inherent disadvantage of using charge cards in their present form.

Thus, there is a need to provide a card processing system by which a user is enabled to make purchases using the card without risking losing the card information to an unauthorized party.

SUMMARY OF THE INVENTION

A method, programmed medium and system are provided for using a payment card with an embedded RFID device. In one example, a cellular telephone or other wireless device is used to generate a one-time password (OTP), which is then transmitted by a read-write RFID in the wireless device to the read-write RFID which is embedded within a payment card. The user's phone or other wireless device will perform the function of OTP=encrypt (SK, T, P) where the pin number (P), known only to the user, is entered on the phone keypad, and the current time T is read from a device clock. The phone or other wireless device then activates the writing of the OTP to the RFID of the payment card where that information is saved. The payment card, with the one time password now saved in the card, is then handed to the waiter or store clerk for payment approval and/or further processing. The user's OTP is then read by the merchant's RFID reader and transmitted to an approving agency/server for approval or disapproval of the user's purchase. The server, in one embodiment, independently calculates the one time password for the designated user and if a match is determined, the user is confirmed as authentic and the transaction amount is processed further for approval and/or disapproval in accordance with the authorizing agency's normal practices.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
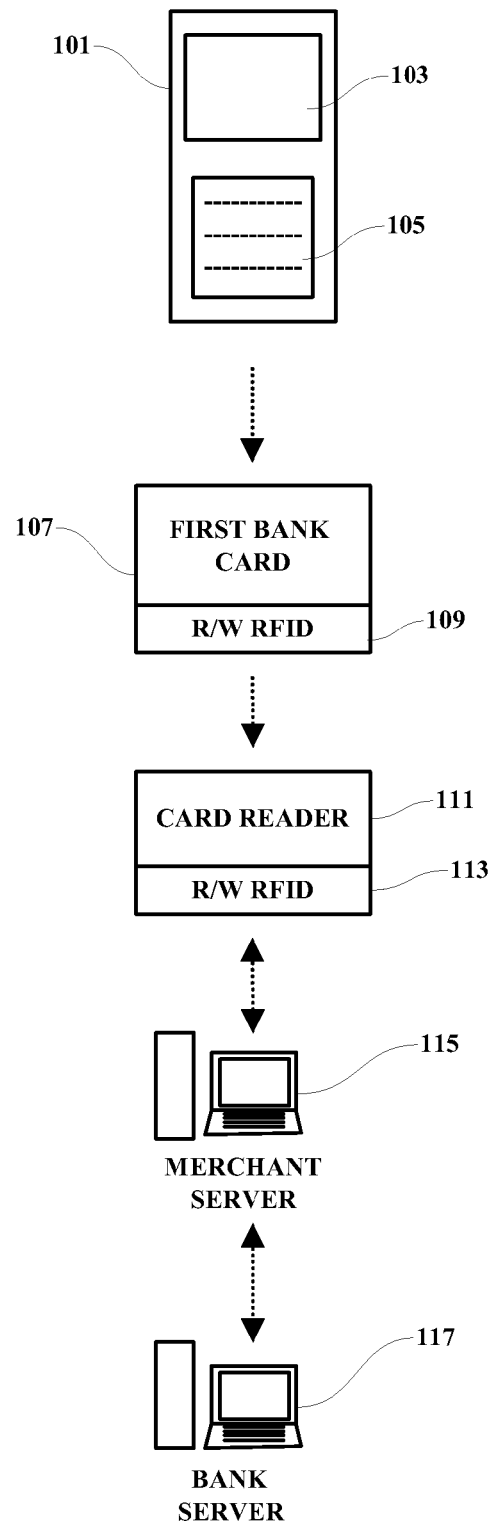
FIG. 1 is an illustration of one embodiment of a system in which the present invention may be implemented.

The various methods discussed herein may be implemented within a computer system which includes processing means, memory, storage means, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a cell phone having an embedded read-write RFID, and a charge card also having a read-write RFID embedded therein, other personal communication devices and/or other portable or wireless devices may also be used, it being understood that disclosed methodology may also be applied in many other available and future devices and systems such as personal wireless and/or hand-held devices, including any of many various input device such as keyboards, keypads, pointing devices, touch-sensitive screens or touch-sensitive input pads, to achieve the beneficial functional features described herein.

The disclosed system provides for the creation of a new payment card that contains no visible account number on the card itself. Instead it contains the technology to generate a "one time use" or one time password (OTP) number that could be "enabled" by using your cell phone, PDA or other wireless device and Bluetooth, or some other method of transmitting information such as read-write RFID. The merchant point of sale reader has a predetermined amount of time to process the transaction. The disclosed process leverages the security maxum of "What you have plus what you know." The user "has" a security key system which may be a small computer system such as a cell phone or other PDA or wireless device, and the user "knows" a secret personal identification number or PIN. Using the computerized device or system and inputting the secret PIN, the device is enabled to generate a one time password: OTP=encrypt(SK, T, Pin), where, OTP=One Time Password, SK=Secret Key unique and embedding in the key fop T=time, Pin=users secret Pin number. The authenticating server also knows this same information so that, given the time of the transaction, the authenticating or charge-approving server can independently calculate the OTP. The T time ensures that the password can only be used within a predetermined designated time "T". This technology requires a computer to calculate the OTP on both the client user end and the authenticating server side.

As hereinafter discussed in greater detail, the OTP process is used in combination with a radio frequency identification (RFID) system to enable a secure charge card approval process. A read-write (R/W) RFID is embedded within the credit card and is programmable to store an OTP which is transmitted from another RFID device within a user's cell phone or other wireless device which makes the encryption calculation. The OTP encryption calculation, as noted above, incorporates the user's PIN, which is input by the user to the user's cell phone or other device. The user's PIN can be entered or permanently stored on the user's phone or other device. The cell phone then writes the OTP onto the charge card's read/write RFID. The charge card can now be safely handed to the merchant's representative, knowing that only one purchase can be made and only within a limited time window. No secondary purchase can be made with the card, and even the first purchase transaction must complete within a limited time. The user's phone or other personal device will perform the function of OTP=encrypt (SK, T, P) where the P pin number is entered on the phone key pad, SK=encryption code and T is the current time read from a system clock within the user's cell phone or other personal device. The phone then activates the writing to the RFID of the charge card. The RFID charge card need not contain any visible personal or user-identifying information on the card itself since all of the information needed to identify the user and the transaction has been written into a charge card memory by an RFID device. The charge card can now be handed to the waiter or store clerk without risking the loss of any personal information which may have previously been visible on the card itself.

Figure 2:
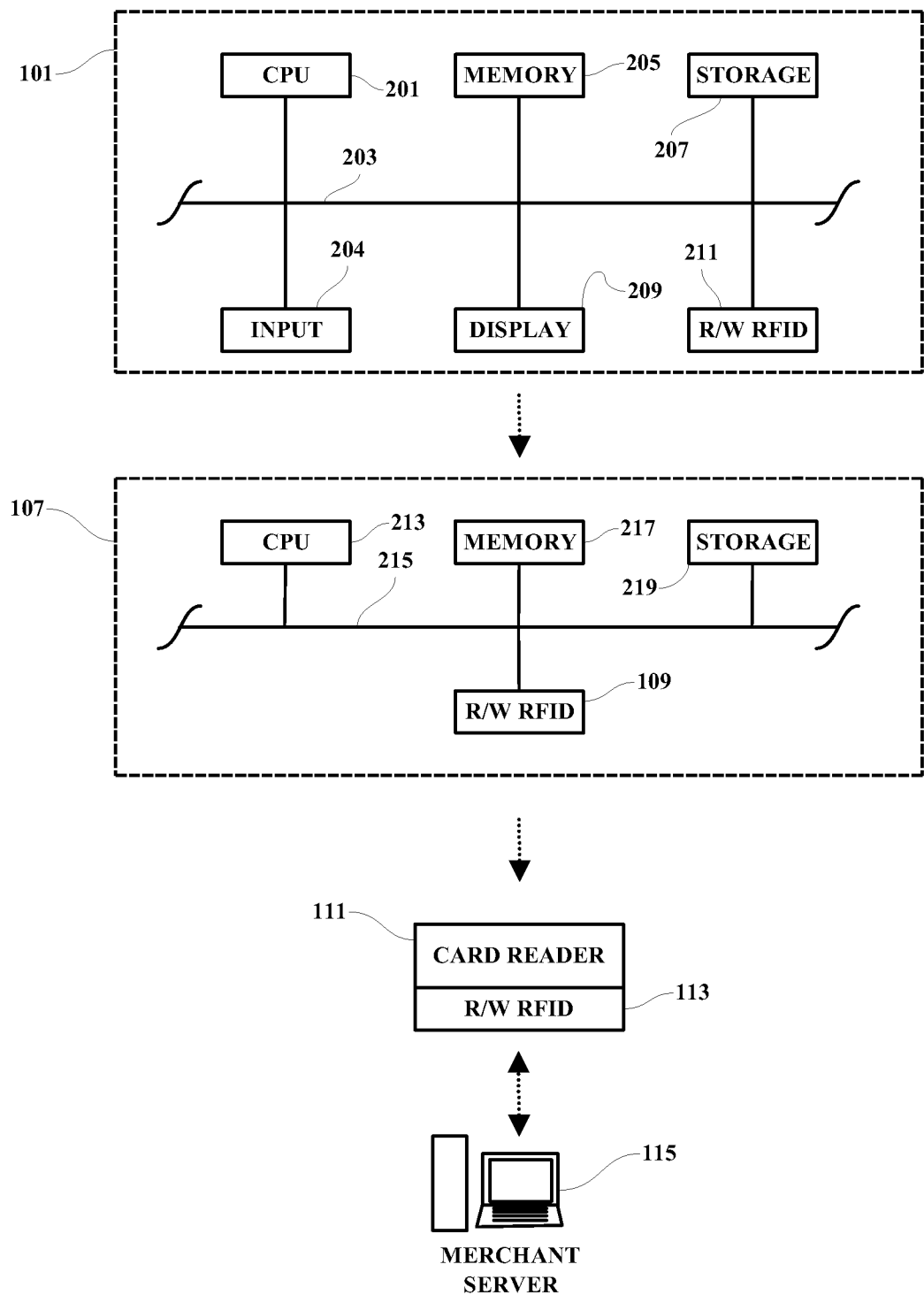
FIG. 2 is a block diagram showing several of the major components of an exemplary computer system or device using the present invention.

In the drawings, FIG. 1 illustrates an exemplary environment in which the present invention may be implemented. As shown, a user's personal communication device 101 such as a cell phone, personal digital assistant (PDA) or other wireless device, includes a display area 103 and a keypad or input area 105. It is noted that, in an alternate embodiment, the display area 103 may extend for the full length of the front of the device 101 and the input function may be implemented, at least partially, with a touch-sensitive screen. The device 101 includes a read/write (R/W) radio frequency identification (RFID) system (FIG. 2) and is enabled to selectively transmit information to another R/W RFID system 109 which is embedded within a charge card 107. The card 107 is configured to store information received from the user device 101, which information may then be read by a card reader 111 which also includes a R/W RFID system 113. The card reader 113, in turn is configured to pass the information read from the charge card 111 to a merchant's server 115 which, in turn, adds merchant-specific information and transmits the read information and the added information to a bank server 117. In the example, the information identifies the user and the merchant and further specifics of a transaction between the user and the merchant for financial approval of a pending transaction.

Figure 3:
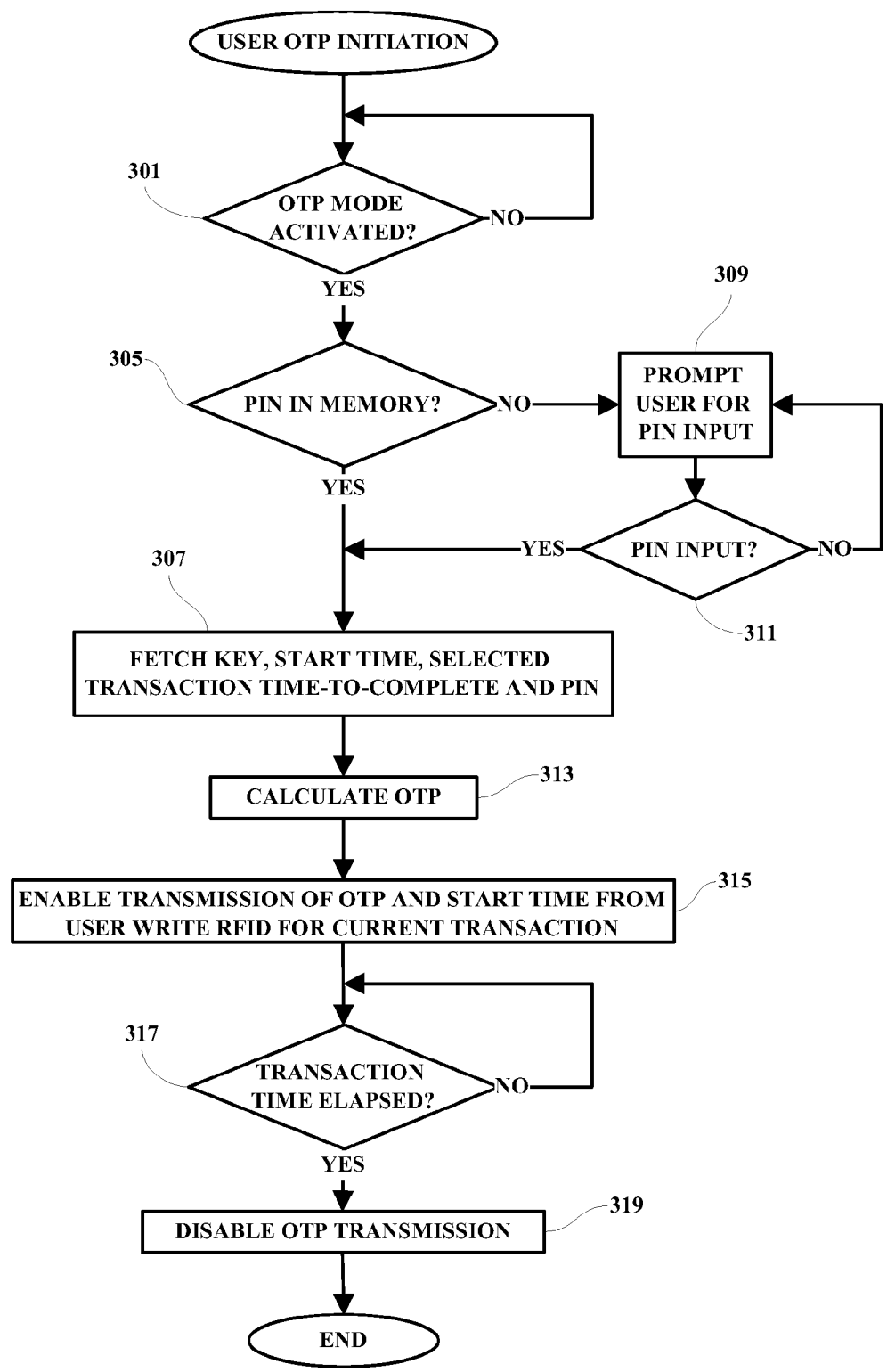
FIG. 3 is a flow chart illustrating an operational sequence which may occur in a user device in an exemplary processing transaction.

In FIG. 3, the user device includes, inter alia, a processor unit 201 and a main bus 203. The bus interconnects the processor unit 201 with a memory unit 205, a storage unit 207, an input device 204, a display unit 209 and a R/W RFID system 211. The functions of the memory 205 and storage system 207 may be combined in a single flash memory unit. As noted earlier, the input function may be implemented in any of many available technologies including by keypad or touch-sensitive display screen or slide-pad. The user device 101 is configured to allow a user to input a secret PIN and calculate a one time password which is then transmitted to a R/W system 109 embedded within the charge card 107. The charge card 107 also includes, inter alia, an embedded processor 213, card bus 215, memory 217 and/or storage system 219. The card 107 receives and stores the calculated OTP information received from the user's device 101 through the R/W RFID system 109. That information is read by a R/W RFID unit 113 of a card reader 113 and sent to the merchant's server 115 and on to the transaction-approving agency's server in the illustrated example.

In the exemplary operational sequence illustrated in FIG. 3, when the user initiates an OTP operation, the OTP mode of the user device 101 is activated 301 and the system determines whether or not the user's PIN is in the device memory 305. If the user's PIN is not in device memory 305, the user is prompted 309 to input the user's secret PIN into the user device 101. When the PIN input is received 311 or if the PIN is already in memory 305, the device fetches the encryption key from device memory and the current or start time of the transaction 307 and together with the PIN calculates the OTP 313 for the current user-merchant transaction. It is noted that the OTP includes the start time of the transaction and the entire transaction must be completed within a predetermined transaction time beginning with the start time or the transaction is not approved/completed. Each OTP is therefore unique and includes the start time and therefore the charge card cannot be used for subsequent transactions unless the user initiates another OTP operation and again inputs the user's own secret PIN which is then combined with the system-fetched start time. Once the OTP is calculated 313, it is enabled to be selectively transmitted 315 from the user device R/W RFID system to be read by the R/W RFID system of the charge card itself as hereinbefore discussed. In one exemplary embodiment, the transaction start time is stored in the user device memory and a timer is initiated so that if the approval transaction is not completed within a predetermined amount of time 317 after initiation, the transmission of the OTP from the user device is terminated or disabled 319 as a safety measure against unauthorized receipt of the OTP during a predetermined approval time period.

Figure 4:
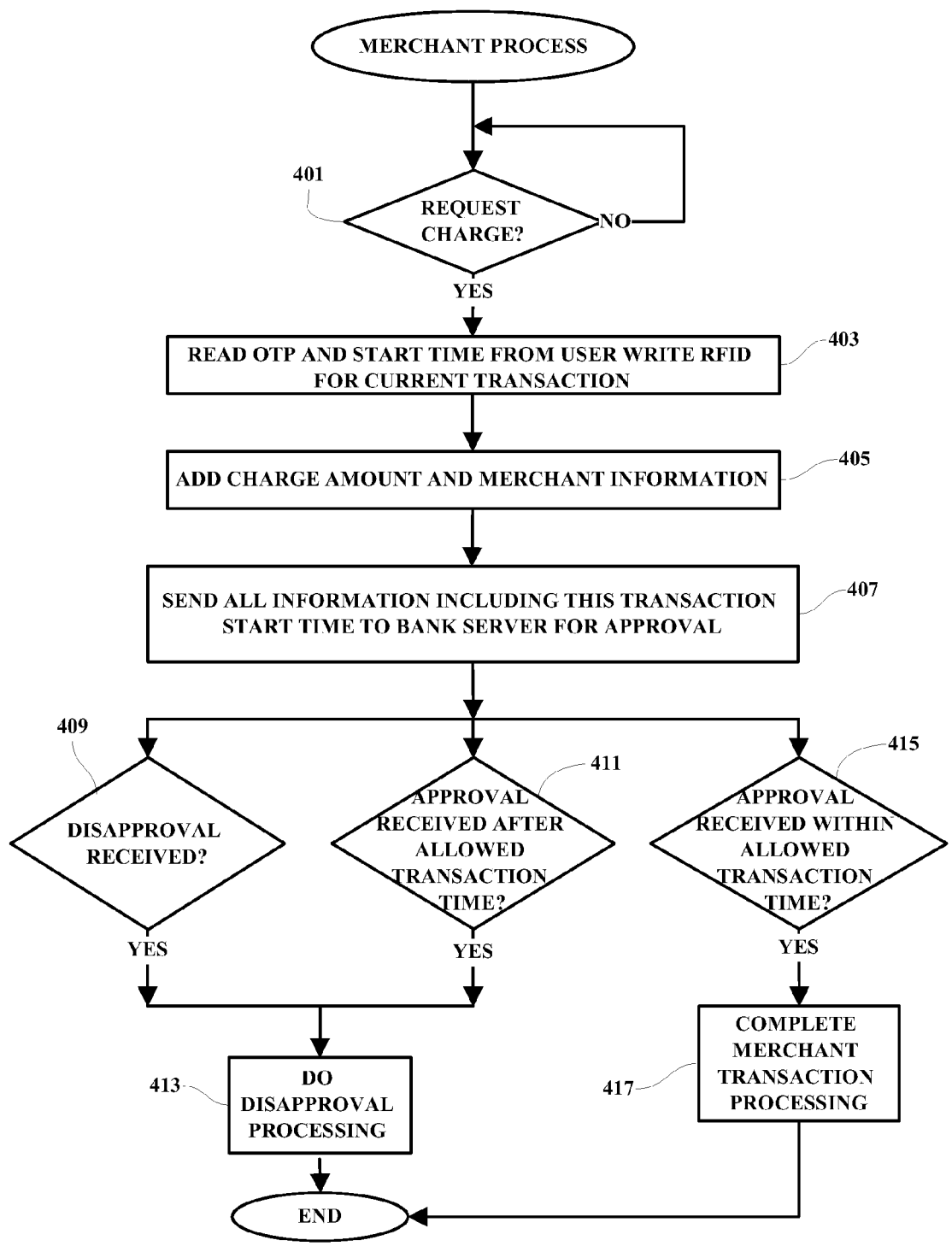
FIG. 4 is a flow chart illustrating an operational sequence which may occur in a merchant server in the exemplary processing transaction.

An exemplary operation sequence of a merchant server process is illustrated in FIG. 4. When a customer has requested a debit or credit charge 401, for example, to a charge card, the charge card information including the OTP and start time, is read 403 from the user's R/W RFID system embedded in the user's charge card. Next, the charge amount and other merchant-related information is added 405 to the charge information data package and all of the transaction information is sent 407 from the merchant server to a bank or other approving agency server to check for user authenticity and charge approval. The merchant server then waits for input from the approving agency server. If a disapproval is received 409 the merchant server processing continues with a disapproval processing routine and the process ends. If approval is received but the allowed transaction time has elapsed 411, then this action also will end the merchant server process. If however, the approving agency sends an "transaction approved" message 415, then the transaction is approved and completed and the merchant process is ended. It is noted that there are many various processes which the merchant server may initiate once approval or disapproval has been received and before ending the merchant server processing and such processing is not shown in the drawings in order not to obfuscate the fundamental processing of an approval transaction.

Figure 5:
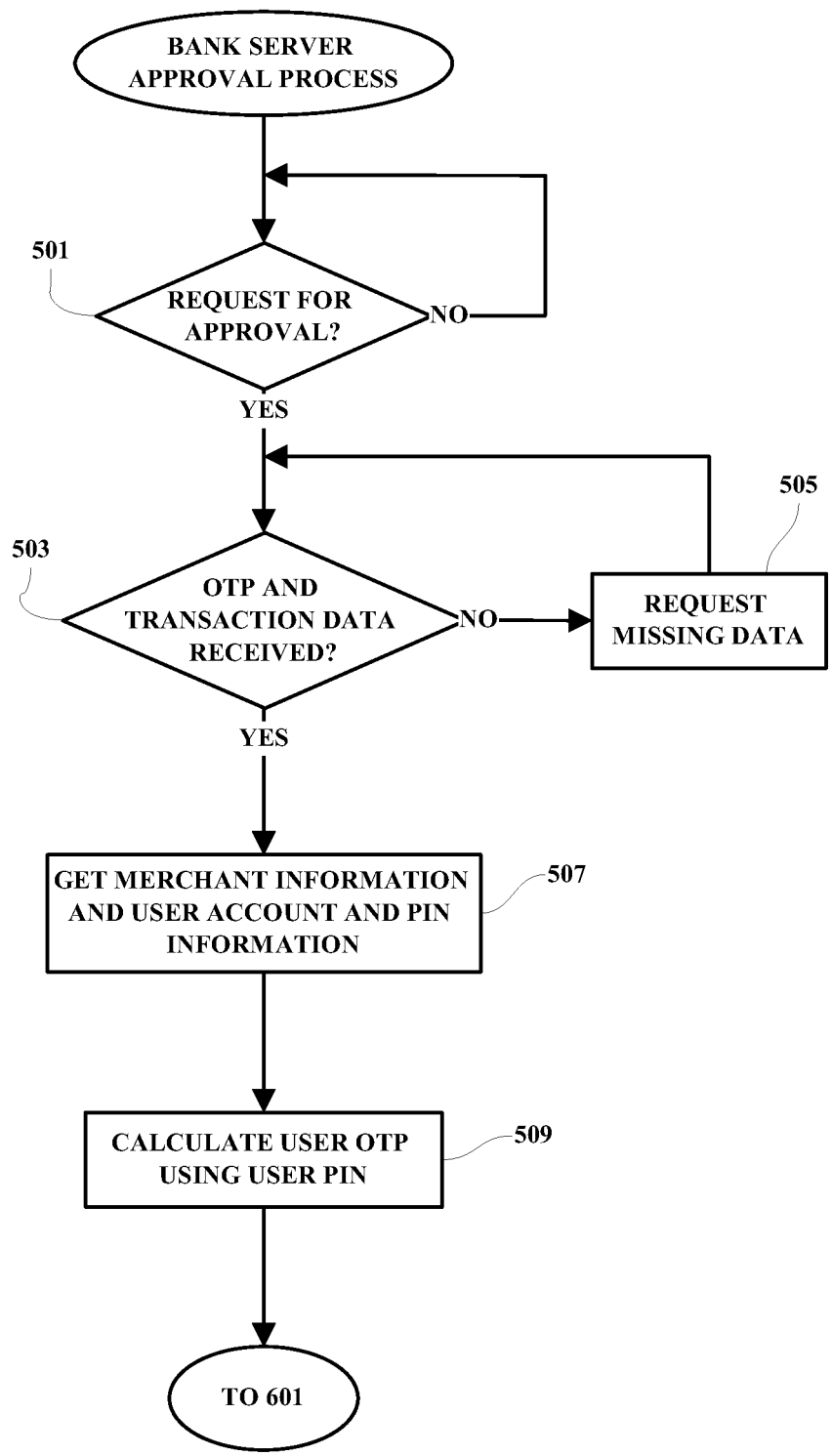
FIG. 5 is a flow chart illustrating an operational sequence which may occur in a bank or other transaction-authorizing server in the exemplary processing transaction.
Figure 6:
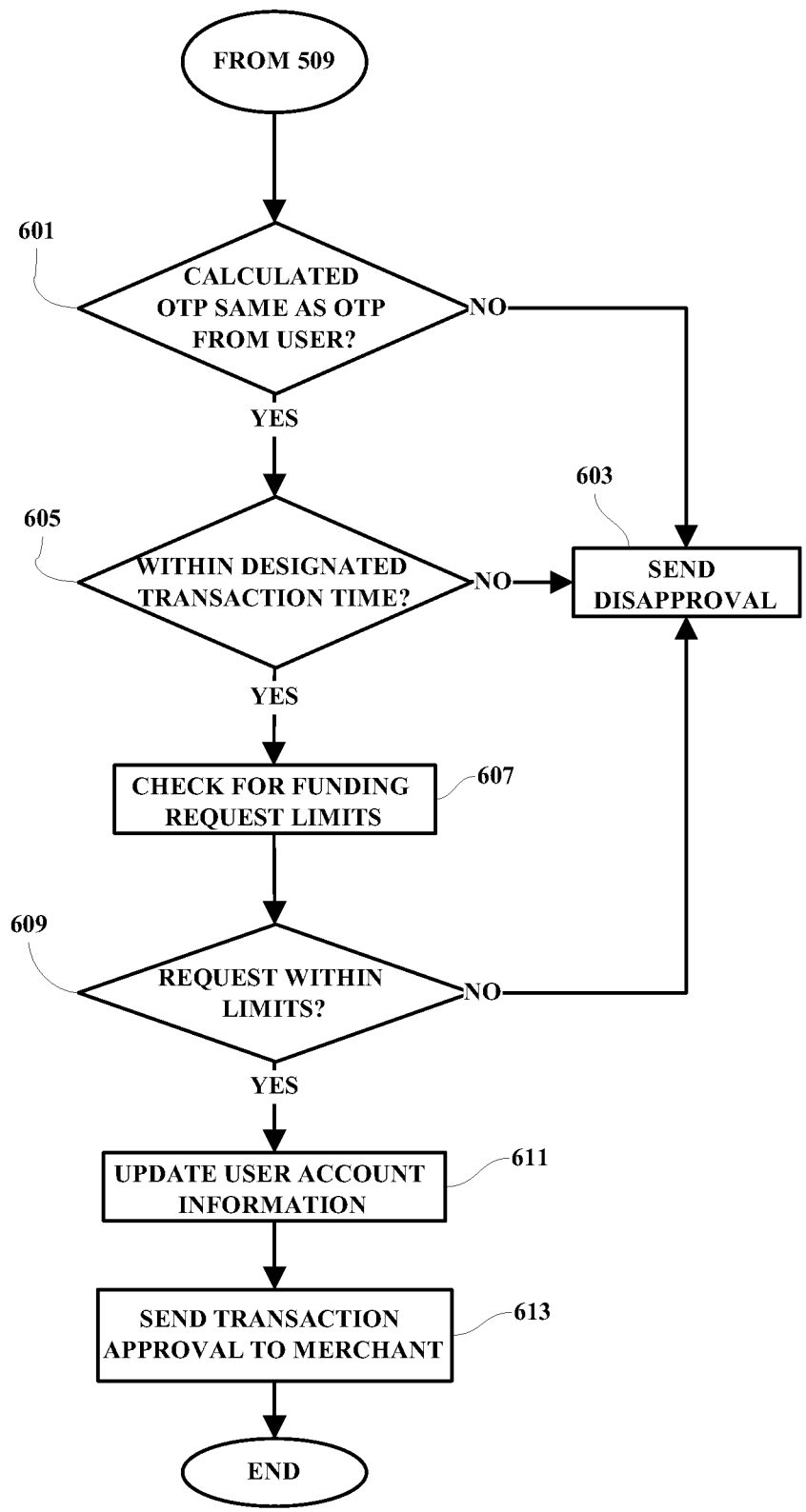
FIG. 6 is a continuation of the flow chart of FIG. 5.

FIG. 5 shows an exemplary process at the approving agency server. When a request for a transaction approval has been received 501, a check is made to insure that the OTP and other transaction data has been received 503, and if all of the necessary information has not been received 503, a message is returned to the merchant server to provide the missing data. Once all of the necessary information has been received 503, the merchant information and user account and PIN information is used 507 to calculate the user's OTP 509, independently of the user. The user's PIN information may be maintained in the approving agency's server, in addition to the user device memory, as a double check for user authenticity. As shown in FIG. 6, after the approving agency has calculated the user's OTP, a check is made to determine if the approving agency's calculated OTP for the user is the same as submitted from the merchant's server 601. If so, the authenticity of the user and the transaction has been established. A check is then made to determine that the approval has been established within the designated maximum limit for the completion of the transaction 605. If within the transaction time 605, a check is made to insure the financial details are in order for transaction approval 607, 609. If all is in order, the user's account information at the approving agency's server is updated 611 and transaction approval is sent to the merchant's server 613. If the approving agency's calculation of the user's OTP does not match what is received from the merchant server 601, or if the transaction approval is not completed within the allowed time limit 605, or if the transaction amount is not within approved limits for the user 609, then the transaction is disapproved and a disapproval message is sent 603 to the merchant's server.

It is understood that the flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is further understood that the specific example presented herein is not intended to be limiting since the functional combinations disclosed herein may be implemented in many different environments and applications including, for example, applications involving the visualization of business processes and movement of emails, task lists, task list items and other system data components within an overall system data containment environment or application.

The method, system and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any media, including any portable or fixed, volatile or non-volatile memory media device, including CDs, RAM and "Flash" memory, or other semiconductor, optical, magnetic or other memory media capable of storing code, from which it may be loaded and/or transmitted into other media and executed to achieve the beneficial results as described herein. The disclosed methodology may also be implemented using any available input and/or display systems including touch-sensitive screens and optically-sensitive input pads. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A machine-implemented method for processing payment for a user transaction, said method comprising:

enabling user input of user-specific information to a computing device operated by said user, said user-specific information including a user personal identification number known only to said user and a transaction approving server;

saving said user-specific information to a device memory unit within said computing device;

saving a start time in said device memory unit, said start time being related to a start of an approval process for said user transaction;

said computing device using said user-specific information and said start time to calculate a user-calculated one time password (UCOTP) for use in said approval process for processing payment for said user transaction;

saving said user-specific information and said start time and said UCOTP in said device memory unit; and initiating a transmission process for transmitting said user-specific information and said start time and said UCOTP to a transaction approving server, said transaction approving server being operable to use said user-specific information and said start time to calculate a server-calculated one time password (SCOTP), said transaction approving server being further operable to compare said SCOTP with said UCOTP and to terminate said approval process if said SCOTP does not match said UCOTP, said method further including:

reading said user-specific information and said start time and said UCOTP from said charge card device;

saving said user-specific information and said start time and said UCOTP read from said charge card device to a memory unit of a first server system, said first server system being associated with a merchant seeking to have said user transaction approved; and transmitting said user-specific information and said start time and said UCOTP from said first server system to a second server system, said second server system being associated with a transaction approving agency, in order to obtain authorization from said transaction approving agency for said user transaction, said method further including a charge card device wherein said computing device includes a radio frequency identification (RFID) device configured for transmitting said user-specific information and said start time and said UCOTP to said charge card device to be stored in a card storage unit within said charge card device, said charge card device being configured to be read by a card reading device to access said user-specific information and said start time and said UCOTP in processing said payment for said user transaction.

2. The method as set forth in claim 1 wherein said computing device is a personal computer, said user transaction comprising a purchase of a product by said user over a publicly available interconnection network from a web site offering products for sale over said interconnection network.

3. The method as set forth in claim 1 wherein said computing device is a cell phone device.

4. The method as set forth in claim 1 and further including:
   preventing said approval process if said authorization is not provided from said transaction approving agency within a predetermined time period relative to said start time.

5. The method as set forth in claim 1 wherein said user-specific information includes information known only to said user and said second server system associated with said transaction approving agency.

6. The method as set forth in claim 5 wherein said computing device is operable to access previously stored user-specific information from said device memory unit to calculate said UCOTP.

7. A charge card device, said charge card device comprising a credit card-sized or smaller article to be used in an approval process for approval of payment for a transaction between a user and a first party, said charge card device including:
   an information receiving system arranged for receiving user-specific information, a transaction start time and a user-calculated one time password (UCOTP) from an external radio frequency identification (RFID) system, said UCOTP being calculated based upon said user-specific information and said transaction start time;
   a card memory unit for saving said user-specific information, said transaction start time and said UCOTP; and
   a card RFID system embedded within said charge card device, said card RFID system being operable to transmit said user-specific information, said transaction start time and said UCOTP received from said first RFID system to be read by a reader device to initiate a transaction approval processing server system, said user-specific information, said transaction start time and said UCOTP to be used in said approval process for approval of payment for a transaction between said user and a first party.

8. The charge card device as set forth in claim 7 wherein said card RFID system includes a read/write (R/W) RFID device.

9. The charge card device as set forth in claim 8 wherein said external radio frequency identification (RFID) system is embodied within a cell phone.

10. The charge card device as set forth in claim 9 wherein said start time is a time related to a time said user initiates said approval process.

11. The charge card device as set forth in claim 10 wherein said card RFID system provides an only input means to said charge card device.

12. The charge card device as set forth in claim 11 wherein said charge card device further includes a card output RFID system, said user-specific information, said transaction start time and said UCOTP being transmitted from said card output RFID system in a format readable by a reader coupled to said transaction approval processing server system.

* * * * *